United States Patent
Han

(10) Patent No.: US 7,545,068 B2
(45) Date of Patent: Jun. 9, 2009

(54) ROTOR FOR USE IN INDUCTION MOTOR

(75) Inventor: Man Seung Han, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 259 days.

(21) Appl. No.: 11/603,007

(22) Filed: Nov. 22, 2006

(65) Prior Publication Data

US 2007/0114872 A1    May 24, 2007

(30) Foreign Application Priority Data

Nov. 23, 2005    (KR) .................. 10-2005-0112298

(51) Int. Cl.
*H02K 21/12* (2006.01)
(52) U.S. Cl. .................. 310/156.57; 310/156.83
(58) Field of Classification Search ............. 310/211, 310/156.57, 156.78, 156.83, 156.84
See application file for complete search history.

(56) References Cited

U.S. PATENT DOCUMENTS

| | | | | |
|---|---|---|---|---|
| 2,525,456 | A * | 10/1950 | Merrill | .............. 310/211 |
| 4,144,469 | A * | 3/1979 | Miyashita et al. | ...... 310/156.28 |
| 4,250,424 | A * | 2/1981 | Sento et al. | .............. 310/218 |
| 4,403,161 | A * | 9/1983 | Miyashita et al. | ...... 310/156.83 |
| 6,268,677 | B1 * | 7/2001 | Takabatake et al. | .... 310/156.55 |

FOREIGN PATENT DOCUMENTS

| | | |
|---|---|---|
| DE | 259 724 | 8/1988 |
| EP | 0 265 364 | 4/1998 |

* cited by examiner

*Primary Examiner*—Dang D Le
(74) *Attorney, Agent, or Firm*—Bacon & Thomas, PLLC

(57) ABSTRACT

A rotor for use in an induction motor includes a main body installed to be rotatable by having a gap inside a stator, providing a flow path of magnetic fluxes produced from the coil, and including a plurality of conductors formed on an edge region of the main body; a pair of barriers formed to pass through the main body in a manner to have a semi-spherical shape from a sectional view, base lines of the semi-spherical shape being disposed to face each other; and a plurality of permanent magnets disposed inside the individual barriers. Therefore, the permanent magnets can be easily affixed to the inner side of the individual barriers, and the loss of the magnetic fluxes is minimized, thereby improving the efficiency of the rotor.

2 Claims, 2 Drawing Sheets

ROTOR FOR USE IN INDUCTION MOTOR

FIELD OF THE INVENTION

The present invention relates to a rotor for use in an inductor motor, and more particularly, to a rotor for use in an inductor motor capable of easily assembling permanent magnets and minimizing damage to magnetic fluxes.

BACKGROUND OF THE INVENTION

In general, a motor is a device that converts electrical energy into mechanical energy to provide a rotational force. Motors are being widely applied to various industrial fields including electric home appliances and industrial machines. Motors can be largely divided into alternating current (AC) motors and direct current (DC) motors.

An inductor motor, which is one type of the AC motors, generates a rotational force by reciprocal reactions between magnetic fluxes, which are produced when AC current flows through a coil wound around a stator, and induction current produced at a rotor inserted into the stator.

With reference to FIG. 1, a conventional induction motor will be descried hereinafter.

FIG. 1 illustrates a top view of a conventional induction motor. A conventional induction motor 10 includes a stator 11, a coil 12 and a rotor 13. The stator 11 is affixed to a casing or a shell (not shown). The coil 12 is wound around the stator 11. The rotor 13 is installed to be rotatable by having a gap inside the stator 11.

The stator 11 is formed by stacking a plurality of silicon steel sheets having the same shape. Although not illustrated, an opening is formed inside the stator 11 to allocate the rotor 13 therein. Teeth 11b are formed to be spaced a certain distance apart from each other along the inner surface of the stator 11, and a plurality of slots 11a are formed between the respective teeth 11b.

The coil 12 is wound around the individual teeth 11b so as to supply AC current, and rotating magnetic fluxes is generated due to the aforementioned structure of the stator 11.

As described above, the rotor 13 is installed to be rotatable by having the gap inside the stator 11, and a shaft 13a passes through a central part of the rotor 13 to be firmly affixed to the rotor 13. Along an edge region of the rotor 13, a plurality of bar-type conductors 13b are inserted into and affixed to the rotor 13. Barriers 13c are formed around the shaft 13a. A plurality of permanent magnets 13d is inserted into each of the barriers 13c.

The shaft 13a is installed to be rotatable by means of bearings of the casing or shell (not shown), which is a frame of the induction motor 10.

The conductors 13b are usually made of aluminum (Al) having excellent electrical conductivity and allowing a die casting method.

The barriers 13c are formed in a shape of circular arcs, and are paired up in a manner to face each other by having the shaft 13a therebetween. The inner side of each of the barriers 13c is filled with air to shield the magnetic fluxes.

The permanent magnets 13d are inserted into each of the barriers 13c and affixed to the individual barriers 13c by being pressed into the inside of the individual barriers 13c. The permanent magnets 13d produce a torque by reciprocally reacting with a magnetic field generated at the coil 12.

In operation, when a certain amount of current is supplied to the coil 12, a rotating magnetic field, generated due to the structure of the stator 11, and the induction current, generated at the conductors 13b of the rotor 13, reciprocally react with each other. As a result, the rotor 13 starts rotating. When the rotor 13 reaches a certain synchronous speed, both the torque, produced by the permanent magnets 13d, and a reluctance torque, produced due to the structure of the rotor 13, cause the rotor 13 to rotate.

However, in the conventional inductor motor 10, since the permanent magnets 13d need to be inserted forcely into the respective barriers 13c, the permanent magnets 13d are likely to be damaged due to friction between the two metals during the assembly. Also, the assembly of the permanent magnets 13d may be complicated.

Moreover, as illustrated in FIG. 1, the barriers 13c are formed to have the circular arcs. There may be the loss of the magnetic fluxes $M_{loss}$ that prevents the torque production because the magnetic fluxes pass through a space between the barriers 13c. As a result, efficiency of the conventional inductor motor 10 may be reduced to a great extent.

Accordingly, it is necessary to develop an inductor motor that can make it easy to install the permanent magnets 13d into the individual barriers 13c, improve productivity, and minimize the loss of the magnetic fluxes so as to improve the efficiency of the induction motor.

SUMMARY OF THE INVENTION

It is, therefore, an object of the present invention to provide a rotor for use in an induction motor, allowing permanent magnets to be firmly affixed to respective barriers and minimize the loss of magnetic fluxes produced at a coil so as to improve the efficiency of the rotor.

In accordance with a preferred embodiment of the present invention, there is provided a rotor for use in an induction motor, wherein the rotor is installed in a stator wounded with a coil, the rotor including: a main body installed to be rotatable by having a gap inside the stator, providing a flow path of magnetic fluxes produced from the coil, and including a plurality of conductors formed on an edge region of the main body; a pair of barriers formed to pass through the main body in a manner to have a semi-spherical shape from a sectional view, base lines of the semi-spherical shape being disposed to face each other; and a plurality of permanent magnets disposed inside the individual barriers.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings so that they can be readily implemented by those skilled in the art.

Figure 1:
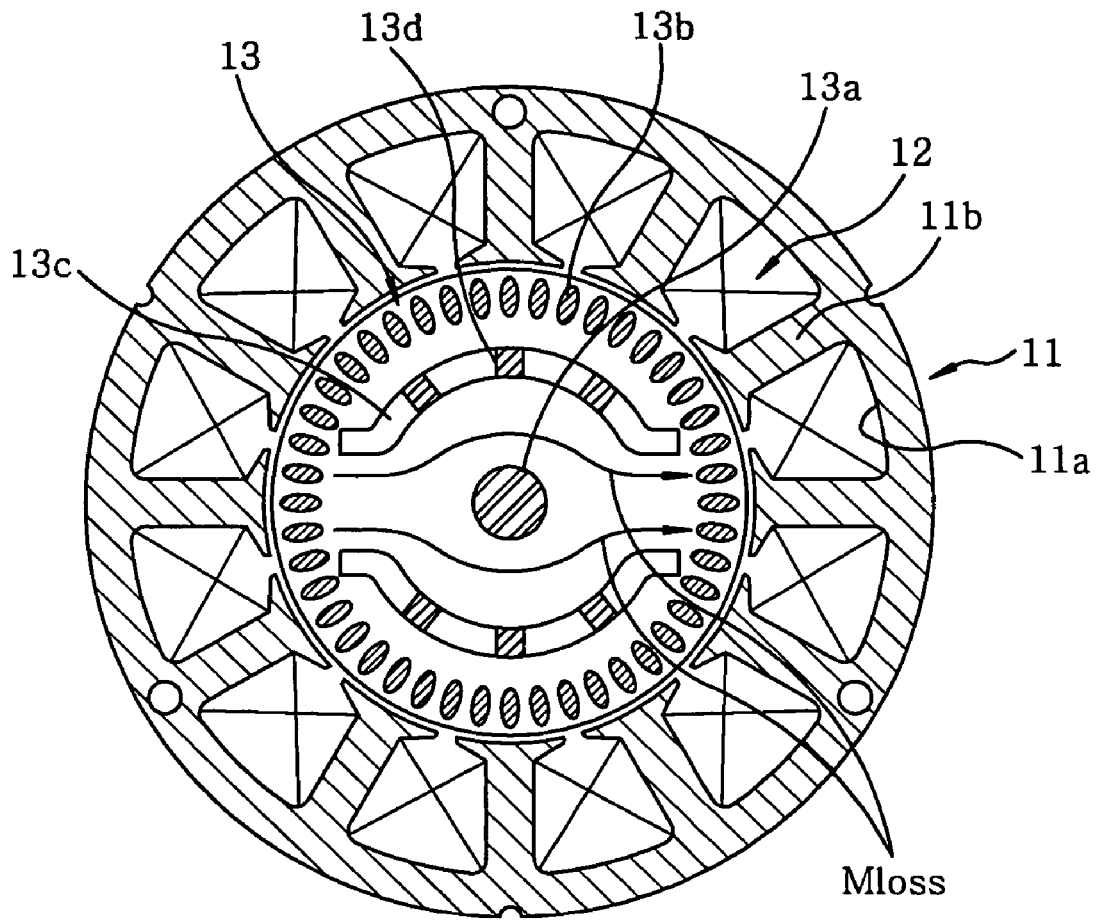
FIG. 1 illustrates a top view of a conventional induction motor.
Figure 2:
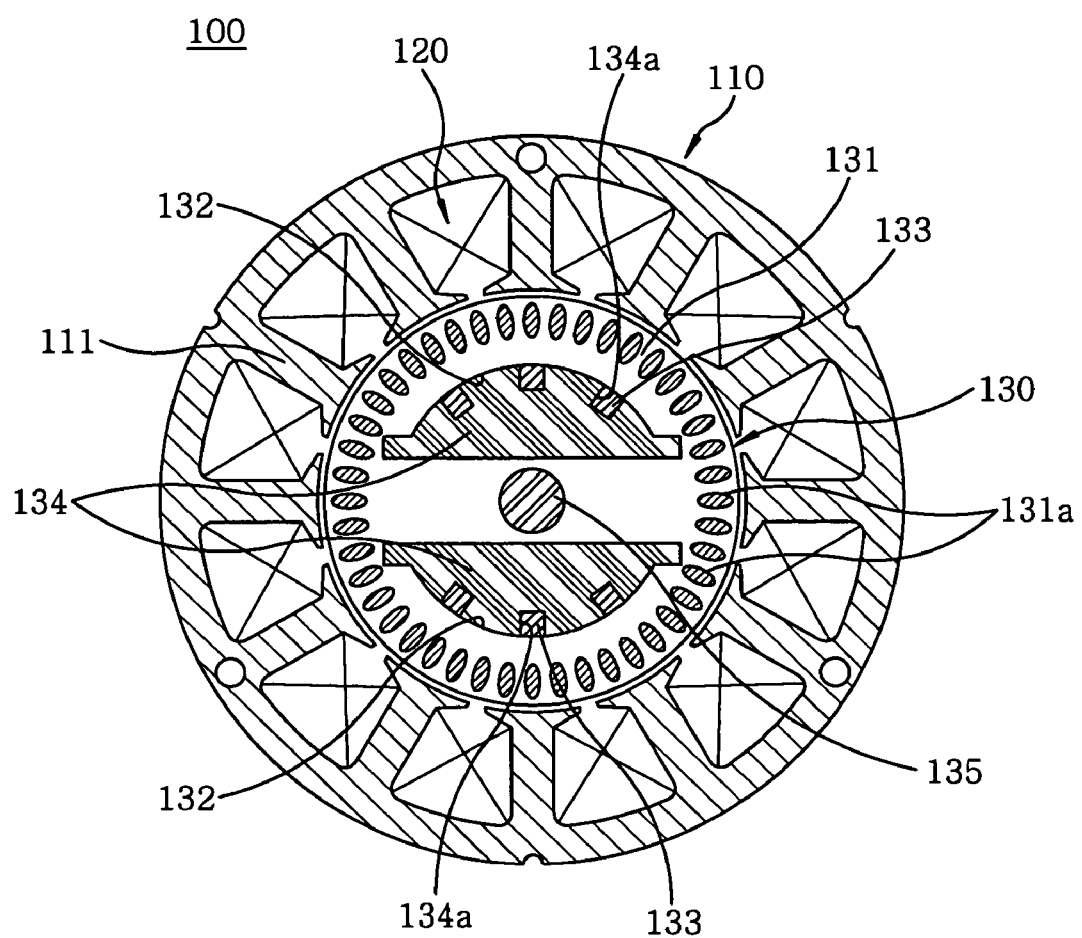
FIG. 2 illustrates a top view of an induction motor in accordance with an embodiment of the present invention.

Referring to FIG. 2, there is illustrated a top view of an induction motor in accordance with an embodiment of the present invention. As illustrated in FIG. 2, An inductor motor 100 includes a stator 110, a coil 120 and a rotor 130. The coil 120 is wound around teeth 111 of the stator 110. The rotor 130 includes a main body 131, barriers 132, permanent magnets 133, and shielding members 134. The main body 131 is installed inside the stator 110. The barriers 132 are formed in the shape of a semi-sphere within the main body 131. The permanent magnets 133 are placed inside the individual barriers 132, and the shielding members 134 are also inserted into the respective barriers 132 to affix the permanent magnets 133 to the individual barriers 132. The shielding members 134 include an insulation material.

The main body 131 may be formed by stacking a plurality of silicon steel sheets or may be a three-dimensional soft magnetic composite (SMC) obtained by a press process on soft magnetic powder. The main body 131 provides a flow path of magnetic fluxes produced from the coil 120, and is installed to be rotatable by having a gap inside the stator 110.

A shaft 135 is inserted into a central region of the main body 131 and affixed thereto. Bar-type conductors 131a are inserted into the main body 131 and spaced substantially the same distance apart from each other along an edge region of the main body 131. The bar-type conductors 131a include Al having excellent electrical conductivity. In the main body 131, the barriers 132 form respective openings by passing through upper to lower portions of the main body 131.

The barriers 132 are paired up and formed in a semi-spherical shape from a sectional view. The base lines of the barriers 132 are arranged to face each other toward a central portion of the main body 131. The permanent magnets 133 are disposed on the inner arc side of the individual barriers 132.

As illustrated in the present embodiment, the permanent magnets 133 are placed in multiple numbers in each of the inner arc side of the individual barriers 132. The permanent magnets 133 compensate for the loss of energy produced at the gap between the main body 131 and the stator 110 and simultaneously produce a torque by reciprocally reacting with a rotating magnetic field.

Each of the shielding members 134 is inserted into the respective barriers 132 to affix the permanent magnets 133 to the individual barriers 132. Particularly, the shielding members 134 include an insulation material such as rubber or synthetic resin to shield a flow of the magnetic fluxes.

Under the situation that the permanent magnets 133 are previously installed into the barriers 132, the shielding members 134 may also be inserted into and affixed to the respective barriers 132. That is, mounting recesses 134a are prepared in the shielding members 134 as many as the permanent magnets 133, and then the permanent magnets 133 are locked into the mounting recesses 134a. Under this condition, the shielding members 134 can be inserted into and affixed to the respective barriers 132.

Even if the shielding members 134 are not previously manufactured, the shielding members 134 can also be inserted into the respective barriers 132 through injection molding. That is, under the situation that the permanent magnets 133 are placed inside the individual barriers 132, the shielding members 134 are fit into the respective barriers 132 through the injection molding, and as a result, the permanent magnets 133 can be affixed to the individual barriers 132.

It is preferable that the permanent magnets 133 are placed in a manner of coming contact with a curved part of each of the barriers 132, i.e., to the inner arc side of the semi-spherical shape by help of the shielding members 134. Thus, in the case where a plurality of the permanent magnets 133 are placed inside of the individual barriers 132, the permanent magnets 133 are arranged to contact the curved part of each of the barriers 132 while being spaced by a certain distance between the permanent magnets 133.

The rotor 130 of the induction motor 100 configured as above operates as follows.

When a certain amount of current is supplied to the coil 120, a rotating magnetic field is produced, and this rotating magnetic field subsequently produces induction current at the conductors 131a. The rotating magnetic field and the induction current reciprocally react with each other to make the rotor 130 rotate. When the rotor 130 reaches a synchronous speed, the rotor 130 continuously rotates due to the torque by the permanent magnets 133 and a reluctance torque produced because of the structure of the rotor 130. That is, as the rotor 130 rotates, the position of the barriers 132 changes, causing magnetic resistance to change as well. As a result of this change in the magnetic resistance, energy accumulated in the gap between the rotor 130 and the stator 110 also changes. Due to the energy change for the rotation position, a torque is produced to thereby provide a rotational force to the rotor 130.

At this time, the shielding members 134, which include the insulation material and are inserted into the inner side of the respective barriers 132 having the semi-spherical shape from the sectional view, minimize the flow path of the magnetic fluxes between the barriers 132. As a result, the loss of the magnetic fluxes when passing through the space between the barriers 132 can be minimized, and thus, most of the magnetic fluxes can contribute to the torque production. This effect improves the efficiency of the induction motor 100.

If the shielding members 134 are previously manufactured and inserted into the respective barriers 132 to be affixed thereto, frictional portions of the permanent magnets 133 with the barriers 132 can be reduced. Thus, the loss of the magnetic fluxes can be minimized during the assembly. Also, even if the multiple permanent magnets 133 exist, the permanent magnets 133 are locked into the respective mounting recesses 134a, so that the permanent magnets 133 are locked into the individual barriers 132. As a result, the permanent magnets 133 are easily affixed to the individual barriers 132.

Also, when the shielding members 134 are formed through injection molding into the respective barriers 132, the shielding members 134 affix the permanent magnets 133 to the individual barriers 132 by the injection molding of the shielding members 134 into the respective barriers 132, while the permanent magnets 133 are positioned freely to the individual barriers 132. Thus, the permanent magnets 133 are unlikely to have friction with the inner surface of the individual barriers 132. As a result, even if the multiple permanent magnets 133 exist, the permanent magnets 133 can be simultaneously installed inside each of the barriers 132, thereby easing the assembly.

According to the exemplary embodiment of the present invention, the rotor for use in the induction motor allows the permanent magnets to be easily installed inside the individual barriers and minimize the loss of the magnetic fluxes produced from the coil. As a result, the efficiency of the rotor can be improved.

While the invention has been shown and described with respect to the preferred embodiments, it will be understood by those skilled in the art that various changes and modifications may be made without departing from the spirit and scope of the invention as defined in the following claims.

What is claimed is:

1. A rotor for use in an induction motor, wherein the rotor is installed in a stator wounded with a coil, the rotor comprising:

a main body installed to be rotatable by having a gap inside the stator, providing a flow path of magnetic fluxes produced from the coil, and including a plurality of conductors formed on an edge region of the main body;

a pair of barriers formed to pass through the main body in a manner to have a semi-spherical shape from a sectional view, base lines of the semi-spherical shape being disposed to face each other; and a plurality of permanent magnets disposed inside the individual barriers, wherein each barrier includes a shielding member for shielding the magnetic fluxes, the shielding member being inserted into the barrier to affix respective permanent magnets to the barrier, and wherein the shielding member has mounting recesses for locking the permanent magnets in the individual barriers.

2. The rotor of claim 1, wherein the permanent magnets are arranged to contact a curved part of each of the barriers while being spaced by a distance between the permanent magnets.

* * * * *